United States Patent
Salameh

(10) Patent No.: US 7,235,286 B2
(45) Date of Patent: Jun. 26, 2007

(54) PROCESS FOR THE MANUFACTURE OF A PLASTIC COMPONENT WITH A SEAL, AND ASSEMBLY UNIT

(75) Inventor: Ralf Salameh, Gondelsheim (DE)

(73) Assignee: Federal Mogul Sealing Systems Bretten GmbH & Co. KG, Bretten (DE)

( * ) Notice: Subject to any disclaimer, the term of this patent is extended or adjusted under 35 U.S.C. 154(b) by 171 days.

(21) Appl. No.: 10/803,768

(22) Filed: Mar. 18, 2004

(65) Prior Publication Data

US 2004/0234723 A1 Nov. 25, 2004

(30) Foreign Application Priority Data

Mar. 28, 2003 (DE) ................. 103 14 033

(51) Int. Cl.
*B32B 3/24* (2006.01)
*F02B 77/02* (2006.01)
(52) U.S. Cl. ............. 428/139; 428/140; 123/90.38; 123/195 C; 277/591; 277/922
(58) Field of Classification Search ........... 428/139, 428/140; 123/90.38, 195 C; 277/591, 922
See application file for complete search history.

(56) References Cited

U.S. PATENT DOCUMENTS

| | | | | | |
|---|---|---|---|---|---|
| 4,498,433 | A | * | 2/1985 | Ogawa | 123/90.38 |
| 5,375,569 | A | * | 12/1994 | Santella | 123/90.38 |
| 5,536,018 | A | * | 7/1996 | Szott | 277/313 |
| 5,957,100 | A | * | 9/1999 | Frohwerk et al. | 123/90.38 |
| 6,382,158 | B1 | * | 5/2002 | Durnen | 123/90.38 |
| 2003/0008105 | A1 | * | 1/2003 | Haack et al. | 428/136 |

FOREIGN PATENT DOCUMENTS

| | | |
|---|---|---|
| DE | 196 23 336 A1 | 12/1997 |
| EP | 0 665 370 A1 | 8/1995 |
| EP | 0 860 602 B1 | 8/1998 |

* cited by examiner

*Primary Examiner*—William P. Watkins, III
(74) *Attorney, Agent, or Firm*—Robert L. Stearns; Dickinson Wright PLLC

(57) ABSTRACT

A plastic component, usable in a combustion engine, is made by forming an elastomeric seal onto at least one support element. The support element, complete with the seal, is placed in a cavity or fixture of a plastic injection mold, and the plastic component is created only by forming plastic material onto the support element. The finished plastic component with the molded-on seal is removed from the cavity.

2 Claims, 2 Drawing Sheets

Figure 5:
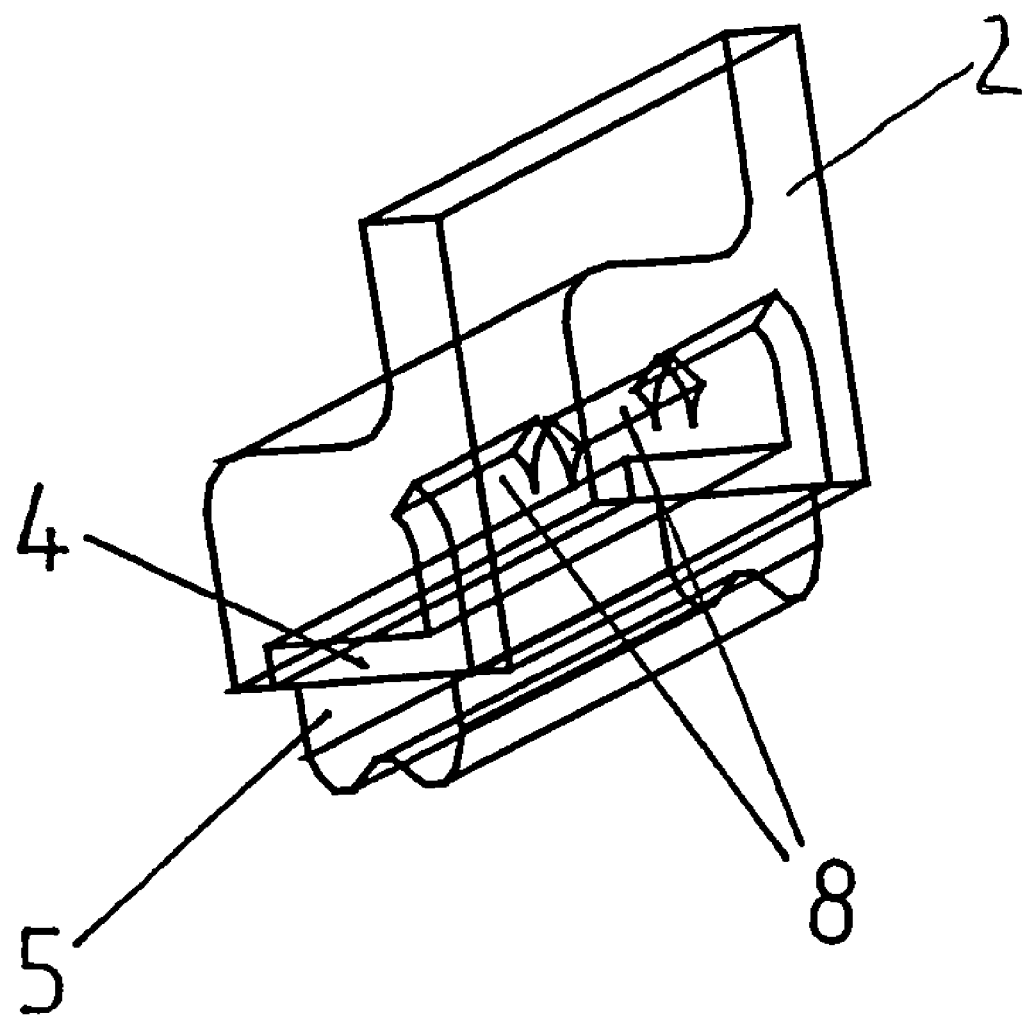

FIG.1
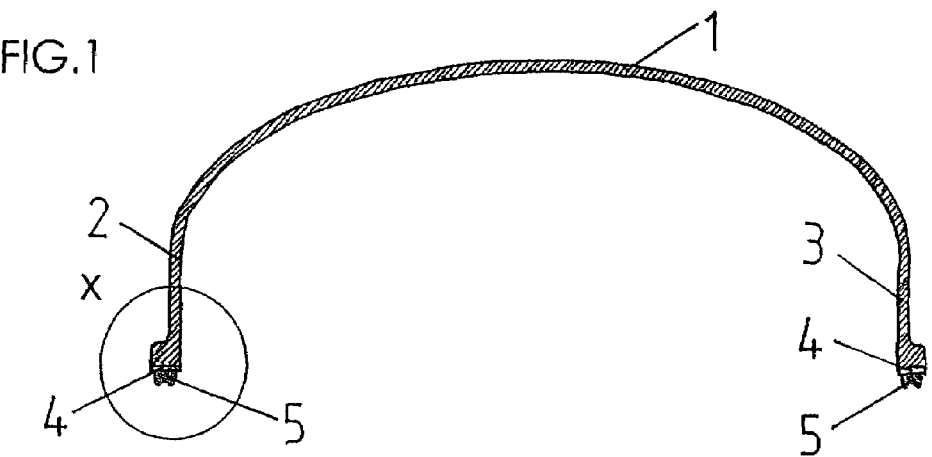
FIG.2  Enlarged view X
FIG.3
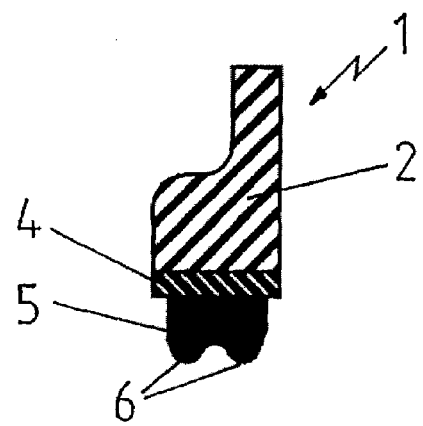
FIG.4
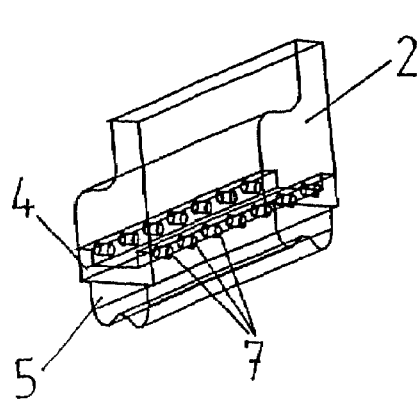
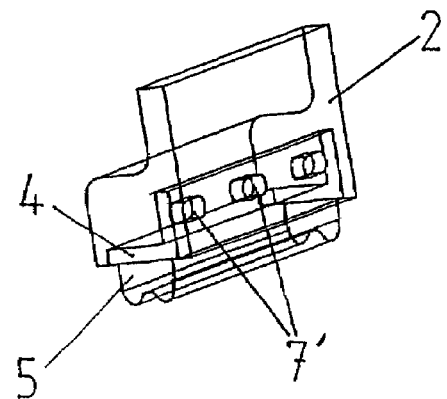

PROCESS FOR THE MANUFACTURE OF A PLASTIC COMPONENT WITH A SEAL, AND ASSEMBLY UNIT

This invention claims priority to German Patent Application No. 103 14 033.6, filed Mar. 28, 2003.

BACKGROUND OF THE INVENTION

1. Technical Field

The invention consists of a process for the manufacture of a plastic component, usable in a combustion engine, connected effectively with an elastomeric seal.

2. Related Art

A plastic cover, made by injection molding, and made of at least two different plastics, can be seen in EP-A 0665370. The cover can be effectively connected with an elastomeric seal. A stiffening material is not indicated between the seal and the plastic cover. In EP-B 0860602, a process for the manufacture of a cylinder head cover for a combustion engine, as well as a cylinder head cover, is described. The cylinder head cover is made using the following process steps:

Forming the cover component out of plastic

Activation of an opposing surface of the seal, in the cover component, by coronal treatment Application of adhesive on the activated surface of the seal and/or a corresponding surface on the cover component Placing the cover component and the seal in a heatable, pre-warmed adhesive fixture Holding the adhesive fixture in a closed condition for a prescribed time at a prescribed temperature, and Removing the finished cylinder head cover from the adhesive fixture.

The seal, which is provided with a support element, is created independently from the cover, so that two different molds are needed to make the individual parts, and a further mold is needed to accept both elements, before an effective connection of the two elements can be achieved.

A cover fixture for closing off motor housings can be seen in DE-A 196 233 36, in particular a valve cover fixture for the cylinder head of a motor vehicle motor. The cover fixture contains a valve cover as well as an elastically bending seal that is seated in a groove that runs around the surface of the valve cover that is oriented toward the cylinder head. A seal holder that can be connected to the valve cover, and which holds the shape of the seal that can be attached between the groove floor and the cylinder head, is provided with pass-through openings for the seal.

For components that are made of plastic, such as covers, lids, or similar, due to the properties of larger tolerances relative to metal covers, the seals have to be able to adapt more. This is based largely on the lower stiffness and larger relaxation and modifying influences than with metal covers.

SUMMARY OF THE INVENTION

The invention addresses the task of preparing a process for manufacturing a plastic component that can be used in the area of a combustion engine, and is connected to an elastomeric seal. The process will no longer have the problems associated with this type of component after it is made, and thereby will lead to a longer lifespan of the plastic components that are effectively connected to the sealing elements.

The task is solved by a process for manufacturing a plastic component that can be used in the area of a combustion engine, and is connected to an elastomeric seal, that contains the following process steps:

The elastomeric seal is formed onto at least one support element; the support element, complete with the seal, is placed in a cavity or mold of a plastic injection tool, and the plastic component is created only by forming plastic material onto the support element; the finished plastic component with the molded-on seal is removed from the tool.

Advantageous extensions of the process described in the invention are to be seen in the associated process-related sub-claims.

Also suggested is an assembly unit, made up of a plastic component that can be used in the area of a combustion engine, and is connected to an elastomeric seal, manufactured using a process adhering to one of the process-related claims.

Advantageous extensions of the assembly unit are to be seen in the associated objective claims.

With the object of the invention, a new technical thought is described for the creation of a sealing system, consisting of a plastic component such as a plastic cover, lid, or similar, effectively connected to an elastomeric seal. The object of the invention is distinguished from the state of the technology by its simplified processing steps, where the required stiffness of the system is provided by the preferably metal support element. The plastic component, such as the cylinder head cover, lid, or similar, can thereby have a simpler design.

Instead of a metal support component, other materials with selectable stiffness can be used.

After the processing steps described in the invention have been carried out, one has a plastic component, such as a cylinder head cover, a lid, or similar, with an attached, preferably molded-on, seal with metal reinforcement. The following advantages are attained by the invention:

The plastic component, such as the cylinder head cover, the lid, or similar, can be mounted using the metal support element directly; screwed on, for instance. The use of inserts, such as bushings, is no longer necessary.

The support element can be made as stiff as desired, so that various applications can be addressed.

The negative properties of the plastic material, with regard to the sealing system, are compensated for by the support element.

By using the support element, screw points are not needed.

The basic system can also be used with a disconnected sealing system.

Any necessary tempering processes for the elastomeric materials do not have to be done together with the entire component, but only with the support element. Since the inherent stiffness is determined largely by the support element, the plastic component, such as the cylinder head cover, the lid, or similar, can be made more simply.

THE DRAWINGS

The object of the invention is represented in the drawing as a sample application, and described as follows. Shown are:

FIG. 1 Section through a plastic cylinder head for a combustion engine, containing a molded-on elastomeric seal;

FIG. 2 Partial representation of a leg of the cylinder head cover containing the seal.

FIGS. 3 to 5 Variants of FIG. 2.

DETAILED DESCRIPTION

FIG. 1 shows a section through a plastic component 1, shown in this example as a cylinder head cover, that is to have two legs 2, 3. In the end areas of the leg 2, 3, an elastomeric seal 5 is molded onto a support element.

FIG. 2 shows an enlarged view of the leg 2 of the cylinder head cover 1. A support element 4 with a rectangular cross section can be seen in this example; formed only on it is an elastomeric sealing element 5 complete with sealing lip 6. The cylinder head cover 1 is made by first molding the elastomeric seal 5 on the support element 4, which is metal in this example. In a subsequent step, the support element 4 containing the elastomeric seal 5 is placed in a cavity or mold of a plastic injection molding machine, and the cylinder head cover 1 is created solely by injection of plastic material, solely onto the support element 4. In this example, a connection is to be brought about between the leg 2 and the support element 4 via chemical bonding processes, such as by the use of an adhesive or similar.

FIGS. 3 to 5 show variants of FIG. 2.

In FIG. 3, the support element 4 has a U-shaped sectional profile. The same can also be made as a strong plastic element that has pass-through openings 7. As previously addressed, the seal 5 is first injected onto the support element 4. After placing the support element 4 in the appropriately shaped cavity of the plastic injection molding machine, the leg 2 of the cylinder head cover being made is injected onto the U-shaped profile 4 only; namely, on its internal profile.

A mechanical connection (interlocking) between support element 4 and leg 2 takes place via the pass-through openings 7.

FIG. 4 shows an alternative to FIG. 3. The metal support element used in this example has an L-shaped cross section, and is also provided with pass-through openings 7'. The sequence of the connection between support element 4 and elastomeric seal 5 takes place analogously to the figures described previously. The cylinder head cover containing the leg 2 is subsequently injected onto it, while a mechanical interlock between the support element 4 and the leg 2 is created via the pass-through openings 7'.

FIG. 5 shows a further alternative to FIG. 3. A metallic support element 4 can be seen, which in this example has a right-angle cross section. The seal 5 is sprayed in place on the longer leg. The short, vertically running leg has openings that create angled tongues 8. The tongues 8 are bent in alternating directions here, so that bent metal edge sections are formed across from each other. Through this means, a good mechanical connection (interlock) between the support element 4 and leg 2 is achieved.

The invention claimed is:

1. A plastic component assembly, comprising:
   an elastomeric seal member;
   a metallic support element to which the seal member is secured;
   a plastic component formed in-place against and attached to the metallic support element; and,
   wherein the support element has upstanding opposite legs connected by a base to define a U-shaped internal profile with pass-through openings in at least one of the legs, the plastic component being attached only to the internal profile and extending into the pass-through openings to interlock the plastic component to the support element.

2. The assembly of claim 1, wherein the plastic component comprises a cylinder head cover.

\* \* \* \* \*